Figure 1:
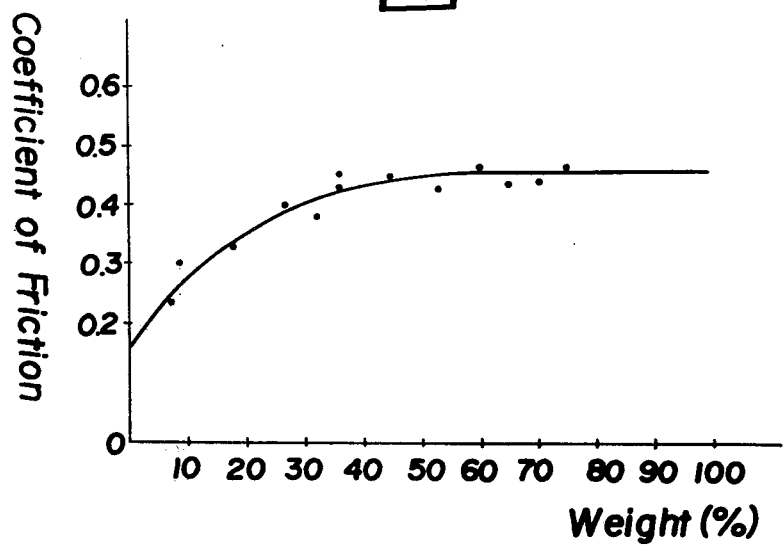

United States Patent [19]

Takamatsu

[11] 4,189,424

[45] Feb. 19, 1980

[54] FRICTION MATERIAL FOR BRAKES OF BICYCLES OR THE LIKE

[75] Inventor: Masatoshi Takamatsu, Sakai, Japan

[73] Assignee: Shimano Industrial Company, Limited, Osaka, Japan

[21] Appl. No.: 897,095

[22] Filed: Apr. 17, 1978

[30] Foreign Application Priority Data

Apr. 18, 1977 [JP] Japan .................................. 52-44678

[51] Int. Cl.² .......................... C08K 3/22; C08K 9/06
[52] U.S. Cl. ............................ 260/42.15; 260/375 B; 260/42.47; 260/998.13
[58] Field of Search ..................... 260/DIG. 39, 42.15, 260/42.47

[56] References Cited

U.S. PATENT DOCUMENTS

| | | | |
|---|---|---|---|
| 3,290,165 | 12/1966 | Iannicelli | 260/42.15 |
| 3,663,497 | 5/1972 | Ninomiya et al. | 260/DIG. 39 |
| 3,891,595 | 6/1975 | Birchall | 260/DIG. 39 |
| 3,959,194 | 5/1976 | Adelmann | 260/DIG. 39 |

*Primary Examiner*—Sandra M. Person
*Attorney, Agent, or Firm*—Stevens, Davis, Miller & Mosher

[57] ABSTRACT

A friction material used for brakes of bicycles or the like, which is constituted mainly of synthetic rubber base materials blended with one or more of titanium oxide, tin oxide, and cobalt oxide, in a ratio of 50 to 75 wt. % with respect to the total weight of the friction material, thereby eliminating the deterioration of braking effect in rainy weather.

8 Claims, 3 Drawing Figures

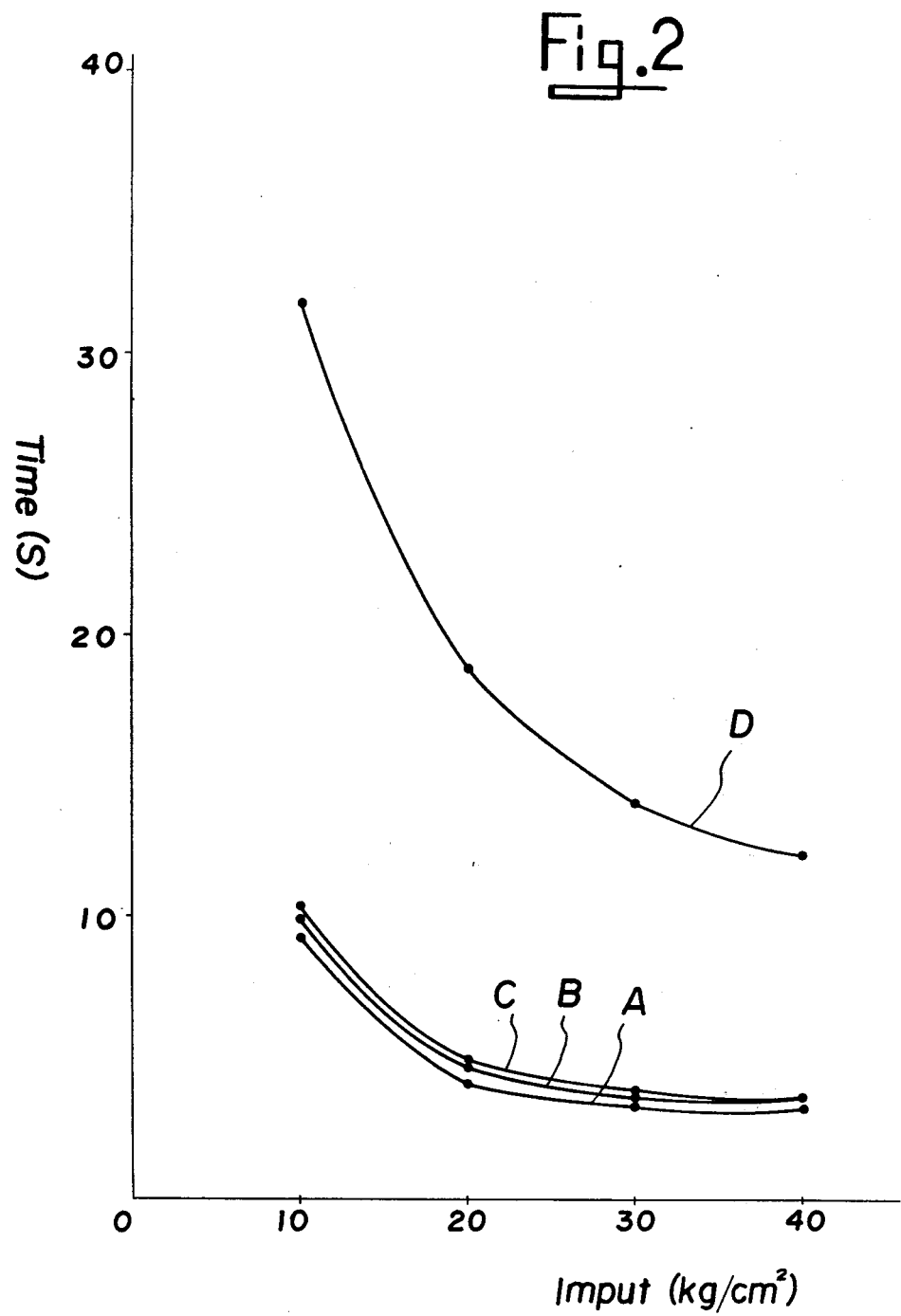

FRICTION MATERIAL FOR BRAKES OF BICYCLES OR THE LIKE

This invention relates to a friction material used for brakes of bicycles, tricycles or other auto bicycles, and more particularly to a friction material used for brakes, such as a caliper brake and rim brake, which are C exposed to the air.

Generally, the caliper brake, rim brake or the like, performs the braking action by pressing the friction material of a brake shoe onto the wheel rim, the friction material being exposed to rain water in rainy weather.

Hence, the friction material used for brakes has mainly been formed of rubbery material like synthetic rubber. The rubbery material, which is exposed to the air when in use, varies in its coefficient of friction accordong to braking conditions, for example, dry or wet conditions, thereby changing the brake effect inevitably. Particularly, friction material of the sythetic rubber family is most used for the calliper brakes, which are subject to considerable deterioration in their braking effect, i.e., delay of braking time in wet condition as shown in the table of test results to be hereinafter described, whereby the braking action in rainy weather is attended with much danger.

From this point of view, the invention has been designed. An object of the invention is to provide a friction material for brakes superior in its braking effect by the absence of extreme deterioration of the braking action even in wet condition. The invention is characterized in that the friction material is composed of a base material, such as synthetic rubber, preferably nitrile butadiene rubber (NBR), blended with one or more metallic oxides, such as titanium oxide, tin oxide, and cobalt oxide, in a ratio of 50 to 75 wt.% with respect to the total weight of friction material.

Figure 3:
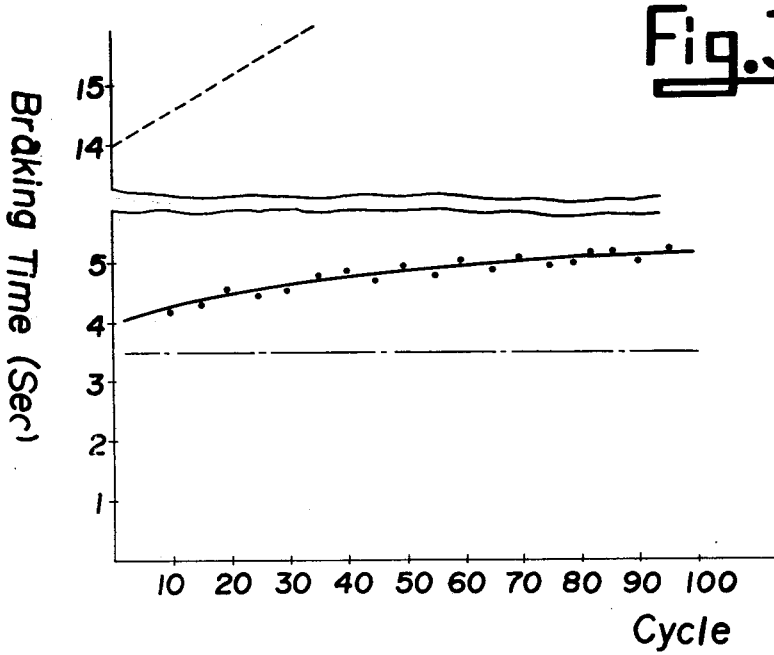

These objects and features of the invention will be detailed in the following description in accordance with the drawings, in which:

FIG. 1 is a graphical representation of the characteristic of the coefficient of friction with respect to the ratio (wt.%) of titanium oxide blended with the rubbery base material, FIG. 2 is a graphical representation of the characteristics of the braking time when using the friction material of the invention as compared to a conventional friction material, the friction material being composed of a synthetic rubber base material blended with each of titanium oxide, tin oxide and cabalt oxide, FIG. 3 is a graphical representation of the braking frequency-braking time relation of the friction material of the invention in comparison with a conventional one.

The friction material of the invention includes the metallic oxides of titanium oxide, tin oxide and cobalt oxide, blended in a ratio of 50 through 75 wt.% with respect to the total weight of the same. The reason for applying the ratio of 50 wt.% or more is that the coefficient of friction is, as shown in FIG. 1, not maximized in the ratio of less than 50 wt.%. Hence, when none or a little of titanium oxide is blended, the brake effect is not so improved, and the braking action is still deteriorated in wet condition. For example, after one hundred braking actions take the braking more time than six seconds. The reason for applying the maximum ratio of 75 wt.% is that the coefficient of friction tends to reach a desired value at the ratio of 50 wt.% or more, whereas even though the ratio of titanium oxide or the like is increased the coefficient of friction is not expected to be improved, and the brake effect which is poor in wet condition is improved as the ratio is increased so as to enable the braking time to be less than 4 seconds at the ratio of 70 wt.%. The, the titanium oxide or the like blended in the ratio above 75 wt.%, makes it impossible to mold the brake material and even if molded through suitable binders, the member in contact with the brake shoe friction material, such as the wheel rim of a bicycle, is peeled, and furthermore the braking effect is lowered in wet condition. For example, metallic oxide added in a ratio of 80 wt.% or more limits the braking effect under the safety standards and the lower blending ratio of synthetic rubber causes extremely poor wear-resistance of brake shoes and also vibrations caused by the braking action causes a cyclist to feel uncomfortable.

As seen from the aforesaid description, the friction material whose base material is blended with the metallic oxide, such as titanium oxide or the like, enables the braking effect to be improved as described in the following embodiment so that the deterioration, i.e., the delay of braking time in wet condition with respect to the frequency of braking actions, may be eliminated. The hardness of the whole material is made 85 IRH (International Hardness Degree) or more, preferably 92 IRH, which is most effective for this purpose.

Next, an experiment illustrating the invention will be detailed in the following description.

In this experiment, the friction material base material of synthetic resin was blended with each of titanium, tin and cobalt oxides and individually was molded into a calliper brake shoe having a hardness of 92 IRH as the specimen. The test was done with a bicycle wheel of 26 in. diameter under the condition of $J = 1.0$ kg m s$^2$, 200.4 rpm (25 km/h) and kinetic energy: 221.34 kg m, and the wheel was rotated in wet condition, to which the shoe was tightened by the strength of 10 to 40 kg/cm$^2$, thus measuring the time (sec) until a stop of rotation.

The test results are shown in the following Table and FIG. 2, where the curve A represents the friction material blended with titanium oxide, B with tin oxide, C with cobalt oxide, and D with the conventional one.

| Shoe Tightening Force (kg/cm$^2$) Sort of Metallic Oxides | 10 | 20 | 30 | (sec) 40 |
|---|---|---|---|---|
| Titanium Oxide | 9.2 | 4.1 | 3.3 | 3.2 |
| Tin Oxide | 9.8 | 4.6 | 3.5 | 3.3 |
| Cobalt Oxide | 10.2 | 4.7 | 3.7 | 3.5 |
| Reference | | | | (sec) |
| Conventional | 31.8 | 18.8 | 14.1 | 12.2 |
| Conventional (dry) | 4.6 | 2.0 | 1.5 | — |

As seen from the test result, the friction materials of the invention have an improved braking strength in wet condition about three to four times the conventional one. Icidentally, 10 to 40 kg/cm$^2$ in the Table and FIG. 2 are changed into 12, 32, 52, and 72 kg of the shoe contact pressure.

The brake shoes of friction material blended with the metallic oxides as described above were applied to brake the wheel and the braking time was measured with respect to the number of times of braking actions in wet condition.

All the braking actions were carried out under 20 kg pressure of shoe contact, in which the wheel was of course kept in wet condition and each interval between braking actions was less than the shoe's drying or half-drying time.

The test result is shown by the solid line in FIG. 3, in which all braking is finished in six or less seconds regardless of increased braking frequency, thus causing no delay of braking time at all.

The braking time is preferred to be less than four to five seconds. For this purpose, the ratio of 70 wt.% or more can keep the braking time under 4 seconds constantly as shown by the horizontal dot-dash line in FIG. 3. In addition, the dotted line in FIG. 3 represents the characteristic of conventional material.

The aforesaid materials are composed of the rubbery base material, such as synthetic rubber, blended with metallic oxides or the like, such as titanium, tin and cobalt oxides, so as to be bound with binders added in solution to the base material, in which the metallic oxides, especially titanium oxide, tin oxide and cobalt oxide, or silane-coupling-processed to be blended with the base material, thereby strongly binding the metallic oxides therewith. In the silane coupling process, silane having a functional group is blended with the metallic oxide, such as titanium oxide, in the ratio of 0.6 to 3 wt.% with respect to 100 wt.% of the oxide by use of the wet or dry process. In detail, liquid silane is dissolved with agitation by water or organic solvent and then titanium oxide is added, or dissolved with titanium oxide added therein by said wet process, or the liquid silane is directly mixed with titanium oxide by a dry process. The silane-coupling-processed titanium oxide as aforegoing is blended with the base material so that the titanium oxide or the like and the base material may strictly be bound in bridge making, thereby preventing the titanium oxide from being separated from the base material.

Typical embodiments of the invention will be described as follows:

In a first embodiment, silicon rubbery base material in an amount of 31.2 wt.% was blended with silane-coupling-processed titanium oxide in an amount of 62.5 wt.% and mixed with addition agents, such as carbon, vulcanizing accelerator, age resister, plasticizer and binder in an amount of 6.3 wt. %, thereby forming a brake shoe having a hardness of 91 IRH.

The braking effect of the shoe was close to the curve A in FIG. 2 and the braking time was improved as shown by the solid line in FIG. 3.

In a second embodiment, nitrile butadiene rubber in an amount of 32.5 wt. % including the aforesaid addition agents was blended with silane-coupling-processed titanium oxide in an amount of 67.5 wt. % so as to form a friction material of 89 IRH.

In this instance, the braking effect was, as shown by the curve A in FIG. 2, improved similarly to the first embodiment and the braking time approached the dot and dash line in FIG. 3 rather than the solid line.

In a third embodiment, styrene butadiene rubber (SBR) in an amount of 30 wt. % was blended with the silane-coupling-processed titanium oxide in an amount of 70 wt. % so as to form a friction material of 89 IRH.

In this instance, the braking effect was as good as in the former embodiment and the braking time was as shown by the dot-dash line in FIG. 3.

As clearly understood from the aforesaid description, the friction material of the invention is composed of the base material blended with titanium oxide, tin oxide and cobalt oxide, in a large quantity of 50 to 75 wt. % with respect to the total weight of the friction material, so that the braking effect in wet condition may be remarkably improved in comparison with the conventional friction material and also capable of performing the braking action without the delay of braking time.

Furthermore, there is no defect such as deteriorating the braking effect in dry condition or peeling the member in contact with brake shoes, such as the wheel rim or the like.

As many apparently different embodiments of this invention may be made without departing from the spirit and scope thereof, it is to be understood that the invention is not limited to the specific embodiments thereof except as defined in the appended claims.

What is claimed is:

1. A friction material for brakes used for bicycles and the like, which comprises a base member of synthetic rubber based on silicone or butadiene blended with one or more of titanium oxide, tin oxide and cobalt oxide, the latter being present in a ratio of 50 to 75 Wt. % with respect to the total weight of the friction material.

2. The friction material according to claim 1, wherein said synthetic rubber is nitrile butadiene rubber (NBR).

3. The friction material according to claim 1, wherein said synthetic rubber is styrene butadiene rubber (SBR).

4. The friction material according to claim 1, wherein said base material includes carbon, vulcanizing accelerator, age resister, plasticizer and binder.

5. The friction material according to claim 1, wherein said material has an International Rubber Hardness degree of 85 or more.

6. The friction material according to claim 1, wherein said titanium oxide, thin oxide and cobalt oxide, are silane-coupling-processed so as to be blended with the base material.

7. The friction material according to claim 6, wherein silane for said silane coupling process is blended with one or more of titanium oxide, tin oxide and cobalt oxide, in a ratio of 0.6 to 3 wt. % or more with respect to the total weight of said oxides.

8. A friction material for a brake used for bicycles or the like, said friction material comprising a rubbery butadiene fibre base material including carbon, vulcanizing accelerator, age resister, plasticizer and binder, said base material being blended with one or more of silane-coupling-processed titanium oxide, tin oxide and cobalt oxide, said oxides being present in a ratio of 50 to 75 wt. % with respect to the total weight of said friction material.

* * * * *